Patented Sept. 4, 1951

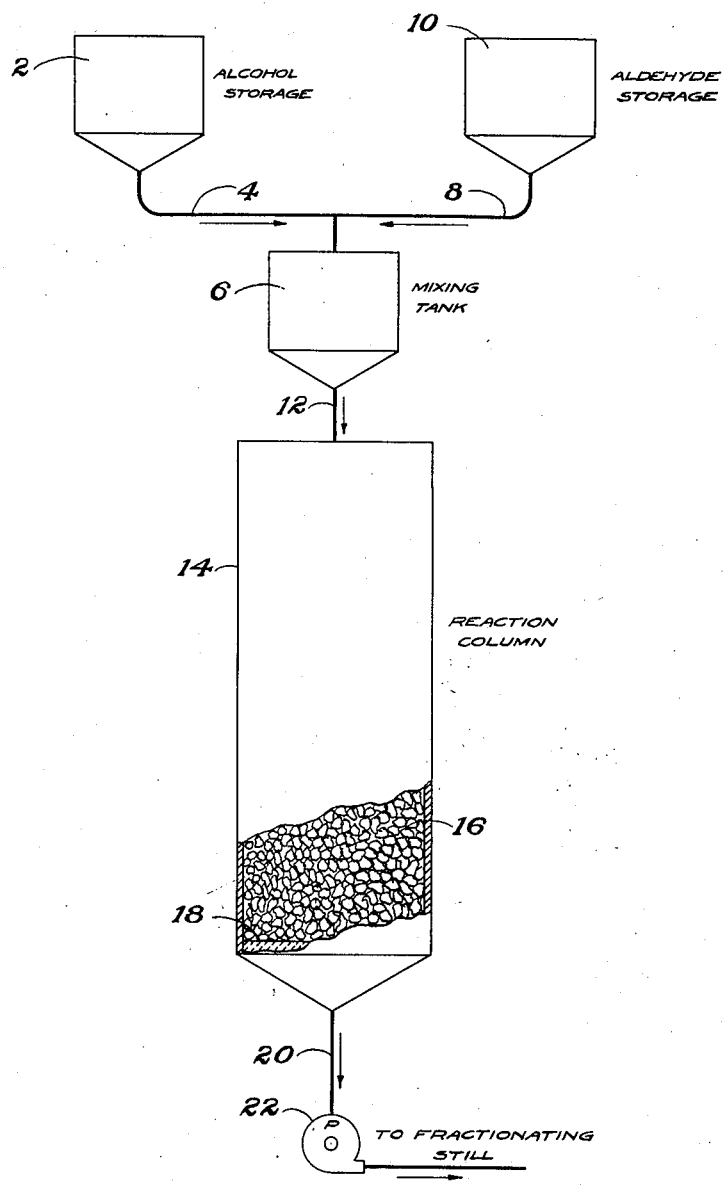

2,566,559

UNITED STATES PATENT OFFICE 2,566,559

PREPARATION OF ACETALS

Arthur A. Dolnick and Maxwell Potash, Philadelphia, Pa., assignors to Publicker Industries Inc., Philadelphia, Pa., a corporation of Pennsylvania Application July 30, 1947, Serial No. 764,804

12 Claims. (Cl. 260—615)

Our invention relates to a novel method for the preparation of acetals. More particularly, it is concerned with a process that is readily adaptable to a continuous method for producing such acetals.

Previously, acetals have been prepared by means of ordinary batch processes under substantially anhydrous conditions and employing an anhydrous mineral acid catalyst such as gaseous hydrogen chloride. The water produced by the reaction was generally removed as formed from the reaction mixture in the form of an azeotrope, with the alcohol used in the process or with a third liquid such as toluene, benzene or xylene, that was added to the mixture. Compounds of this type have also been prepared by reacting the aldehyde and alcohol in the presence of an acid without azeotropically distilling off the water of reaction. After the reaction is complete, the catalyst is neutralized and the product isolated by distillation. While relatively good yields can be obtained by the use of such processes, the overall efficiency thereof is relatively low because of the comparatively small yield of acetal per unit volume of reactor space and the maintenance costs on equipment owing to corrosion thereof by the acid catalyst. Also, the first-mentioned process is made more expensive to operate by the fact that heat must be supplied to the reaction mixture throughout the reaction in order to remove water therefrom. Moreover, the reaction, when effected in accordance with such a process, requires a period of several hours for completion. After the reaction has been effected, the acid catalyst must be neutralized prior to distillation in order to avoid decomposition of the acetal.

We have now discovered a method for preparing acetals which is free from the foregoing disadvantages and which can easily be designed to operate continuously and automatically, thus eliminating the necessity of the batch process technique previously used, and also eliminating the need for careful addition and subsequent neutralization of the catalyst. In accordance with the process of our invention, we have found that acetals can be readily prepared in good yields by contacting, preferably at 25° to 30° C., a fixed bed of an acid cation exchange resin with a moving mixture of alcohol and aldehyde, and thereafter isolating the acetal thus produced from the resulting effluent mixture.

One of the most outstanding and surprising features of our invention resides in the fact that normal conversions and yields can be secured by using a catalyst contact time of only thirty seconds, or otherwise expressed, the feed mixture may be introduced into the reaction column at a rate of 7500 ml. per hr. per 100 g. of resin. With the highest throughput tested, the feed rate was found to be equivalent to 54 liters per hr. per liter of resin. However, there was no indication that higher feed rates would not be feasible. On the other hand, for the same degree of conversion with batch processes catalyzed by the use of a mineral acid, a reaction period of the order of twenty hours is generally required.

Our invention may be further understood by reference to the accompanying drawing, partly in section, which is a diagrammatical representation of a particular design and arrangement of apparatus we have found suitable and is described in connection with the preparation of 1,1-dibutoxyethane. Butanol contained in tank 2, is conducted by gravity through line 4 to mixing tank 6 where it is mixed with acetaldehyde introduced through line 8 from tank 10. After the reactants have been thoroughly mixed, they are conducted by gravity through line 12 into reaction column 14 which is packed with an acidic cation exchange resin 16, supported on porous plate 18. Thereafter the reaction mixture is conducted through line 20 by means of pump 22 to a suitable fractionating still and the 1,1-dibutoxyethane, thus produced, separated.

While the proportion of alcohol to aldehyde utilized in carrying out our invention may vary widely, we have found it generally desirable to employ such reactants in a ratio of from about 4 to 5 moles of alcohol to one mole of aldehyde. With alcohol-aldehyde ratios approaching those stoichiometrically required, the yield of acetal is appreciably lower owing to the fact that the acetalization is an equilibrium reaction and high conversions are favored by an excess of one of the reactants.

The resin employed in carrying out the process of our invention may be any of the known acidic cation exchange resins. As example of such materials there may be mentioned the sulfonated phenol formaldehyde resins known in the trade as "Amberlite IR-100," manufactured by Resinous Products and Chemical Company, the sulfonated coals, some of which are marketed to the trade under the name "Zeo-Karb," prepared by the Permutit Company, the "Duolite" resins, made by the Chemical Process Company, which are sulfonated condensation products of an aldehyde and a hydroxy aromatic compound, such as for example a sulfonated phenol-formaldehyde resin, and the like. In actual practice we have found that resins of the aforesaid type are extremely stable and possess an exceptionally long life. In fact, certain of these materials have been employed for periods of several months producing up to as much as 300 lbs. of pure acetal per pound of resin, without any observable decrease in activity.

Examples of acetals that may readily be prepared in accordance with the process of our invention are 1,1-dibutoxy-2-ethylhexane, 1,1-dipropoxybutane, 1,1-dibutoxybutane, 1,1-diethoxyethane, 1,1-dibutoxyethane, dibutoxyphenylmethane, 1,1-dibutoxy-2-phenylethane, dimethoxymethane, and the like. Also, acetals such as 1,1,3-trimethoxybutane or 1,1,3-triethoxybutane, etc., may be prepared from crotonaldehyde and methanol and ethanol, respectively.

Our invention may be further illustrated by the following specific examples:

Example 1

An acidic cation exchange resin known as "Duolite C-3," a sulfonated condensation product of a hydroxy aromatic compound as an aldehyde, such as formaldehyde, is first screened to remove the small amount of fines present therein. The screened product, thus obtained, having an average particle size of from 20 to 60 mesh, is next extracted with ethanol in a Soxhlet type extractor in order to reduce the concentration of colored impurities in the resin. The resin thus treated is then allowed to swell in butanol after which it is introduced into a glass reactor tube having an I. D. of 16 mm. to give a stationary catalyst bed 380 mm. high and occupying a volume of approximately 75 ml. If desired, at the bottom of the reaction tube and between the porous plate thereof and catalyst bed may be placed ten grams of potassium carbonate which serves to neutralize the effluent reaction mixture as it issues from the bottom of the catalyst bed. After the reaction tube is thus made ready for use, a reaction mixture containing the reactant in a ratio of 5 moles of butanol to 1 mole of acetaldehyde is allowed to flow by gravity at 28° C. into the top of the reactor tube. The feed mixture is passed downwardly through the column at rates varying from 150–4000 ml./hr. No appreciable heat effect is noticeable in the catalyst tube during conversion. The product collected from the reaction column is then subjected to distillation at atmospheric pressure. The quantity of acetaldehyde obtained amounts to from about 1% to 3% of the feed mixture charged to the reaction tube. A butanol-water azeotrope at 93° C. is then obtained, followed by a substantially pure butanol fraction at 117° to 118° C. After a small intermediate cut from 120° to 180° C. containing about 80% acetal, substantially pure acetal is distilled over from 180° to 190° C. The combined acetal of the two latter fractions give yields of from 70 to 80 mole percent, based on the acetaldehyde charged to the reactor. The 1,1-dibutoxyethane thus obtained is a water-white product with a mild characteristic acetal odor. The recovery of acetaldehyde amounts to around 10% of the aldehyde in the fresh reaction mixture which corresponds to a conversion of about 90%. The butanol separated in the fractional distillation of the crude reaction mixture can be recycled with fresh acetaldehyde to give results equally as good as those obtained with fresh butanol.

Example 2

A mixture containing a five to one molar ratio of butanol to paraformaldehyde is prepared by refluxing the mixture in order to bring about the solution of paraformaldehyde. The resulting clear solution is then passed at room temperature through the apparatus and exchange resin used in Example 1 at the rate of 210 ml./hr. On distillation of the crude reaction mixture, dibutoxymethane is obtained in a 54 mole percent yield based on the paraformaldehyde.

Example 3

Thirty-seven grams of Zeo-Karb H resin is washed with six liters of distilled water to remove any free acid. The washed resin is next charged to a reactor tube having an I. D. of 16 mm. and containing at the lower portion thereof, six grams of sodium carbonate held in place by means of a sintered glass plate. A mixture consisting of butanol and acetaldehyde in a ratio of 5 moles of the former to 1 mole of the latter is then passed into the reaction tube through the resin bed at the rate of 150 ml./hr. A total of 16.4 liters is passed through the resin at intervals over a period of six weeks. At the end of this time the yield is found to be 72 mole percent with no observable diminution in activity of the exchange resin.

It is to be specifically understood, of course, that the foregoing examples are merely illustrative of our invention, and the latter is to be in no way construed as being limited to a process for preparing the particular acetals described in the examples. It will also be apparent that our invention is susceptible of numerous modifications without departing from the scope thereof. For example, the process of our invention may be effected with equal ease and effectiveness in apparatus constructed of metal such as the various grades of fabricating steel, etc. Also, if desired, as previously pointed out, the reaction column need not contain an alkaline compound to insure against the presence of acid in the effluent mixture; under such circumstances, if considered necessary or desirable, a suitable alkaline compound may be added to said mixture in an amount of from about 1% to 3% prior to recovering the acetal by distillation. In this connection, while such resins are essentially solid insoluble acids that do not give free acid in the effluent mixture, it may be found desirable, in some instances, to pack the lower portion of the column, immediately following the catalyst bed with a granular alkaline compound such as an alkali metal compound, for example, potassium carbonate, sodium carbonate, etc., in order to counteract any initial acidity of the acetaldehyde or small quantities of acid leached from the resin. It will be further apparent that, if desired, the position of the resin and alkaline compound, if employed, in the reaction column may be reversed and the mixture of aldehyde and alcohol introduced under pressure at the bottom of the column and the acetal containing mixture drawn off at the opposite end of the column.

What we claim is:

1. In a process for the preparation of acetals, the steps which comprise contacting a stationary bed of an acidic cation exchange resin with a fluid, moving mixture containing essentially an alcohol and an aldehyde and thereafter withdrawing a mixture comprising acetal from said stationary bed.

2. In a process for the preparation of acetals, the steps which comprise contacting a stationary bed of a sulfonated coal type acidic cation exchange resin with a fluid, moving mixture containing essentially an alcohol and an aldehyde and thereafter withdrawing a mixture comprising acetal from said stationary bed.

3. In a process for the preparation of acetals, the steps which comprise contacting a stationary bed of a sulfonated phenol formaldehyde type acidic cation exchange resin with a fluid, moving mixture containing essentially an alcohol and an aldehyde and thereafter withdrawing a mixture comprising acetal from said stationary bed.

4. In a process for the preparation of acetals, the steps which comprise contacting a stationary bed of an acidic cation exchange resin with a fluid, moving mixture containing essentially an alcohol and an aldehyde, thereafter withdrawing a reaction mixture comprising acetal from said stationary bed, and distilling such mixture while in contact with an alkaline compound to obtain the acetal in substantially pure form.

5. In a process for the preparation of acetals, the steps which comprise contacting a moving fluid mixture containing essentially an alcohol and an aldehyde with a stationary bed of an acidic cation exchange resin catalyst, thereafter contacting the resulting mixture with a fixed bed of an alkaline compound, withdrawing the mixture thus obtained from said stationary bed of acidic cation exchange resin, and separating therefrom the acetal thus produced.

6. In a process for the preparation of acetals, the steps which comprise contacting a moving fluid mixture containing essentially an alcohol and an aldehyde with a fixed bed of a sulfonated coal type acidic cation exchange resin catalyst, thereafter contacting the resulting mixture with a fixed bed of an alkaline compound, withdrawing the mixture thus obtained from said fixed bed of acidic cation exchange resin, and separating therefrom the acetal thus produced.

7. In a process for the preparation of acetals, the steps which comprise contacting a moving fluid mixture containing essentially an alcohol and an aldehyde with a fixed bed of a sulfonated phenol formaldehyde acidic cation exchange resin catalyst, thereafter contacting the resulting mixture with a fixed bed of an alkaline compound, withdrawing the mixture thus obtained from said fixed bed of acidic cation exchange resin, and separating therefrom the acetal thus produced.

8. In a process for the preparation of 1,1-dibutoxyethane, the steps which comprise contacting a stationary bed of an acidic cation exchange resin with a fluid moving mixture containing essentially butyl alcohol and acetaldehyde and thereafter withdrawing a mixture comprising 1,1-dibutoxyethane from said stationary bed.

9. In a process for the preparation of 1,1-dibutoxymethane, the steps which comprise contacting a stationary bed of an acidic cation exchange resin with a fluid moving mixture containing essentially butanol and formaldehyde and thereafter withdrawing a mixture comprising 1,1-dibutoxymethane from said stationary bed.

10. The process of claim 8 in which the acidic cation exchange resin is a sulfonated coal.

11. The process of claim 8 in which the acidic cation exchange resin is a sulfonated phenol-formaldehyde condensation product.

12. The process of claim 5 in which the alkaline compound is an alkali metal carbonate.

ARTHUR A. DOLNICK.
MAXWELL POTASH.

REFERENCES CITED

The following references are of record in the file of this patent:

UNITED STATES PATENTS

| Number | Name | Date |
|---|---|---|
| 1,864,908 | Jaeger | June 28, 1932 |
| 2,382,874 | Gresham | Aug. 14, 1945 |
| 2,451,949 | Heinemann | Oct. 9, 1948 |

FOREIGN PATENTS

| Number | Country | Date |
|---|---|---|
| 507,571 | Great Britain | June 14, 1939 |

OTHER REFERENCES

"Catalysts by Acid-Regenerated Cation Exchangers," by Sidney Sussman; I. & E. Chem., vol. 38, No. 12, Dec. 1946, pages 1228–1230.